United States Patent Office 3,209,875
Patented Oct. 5, 1965

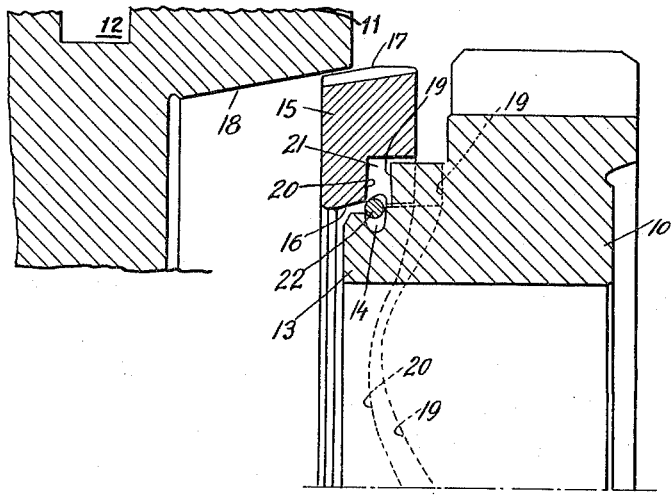
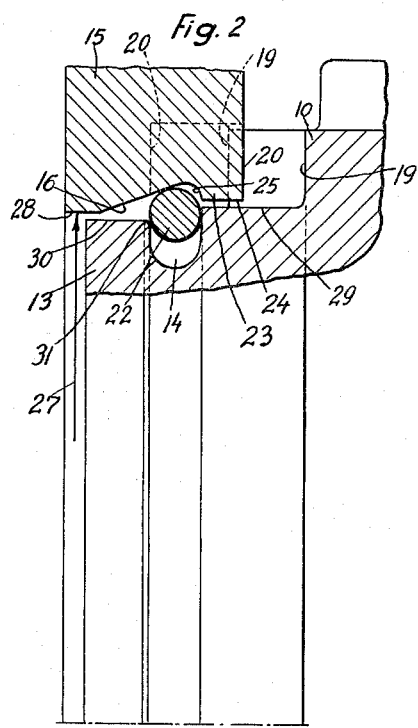
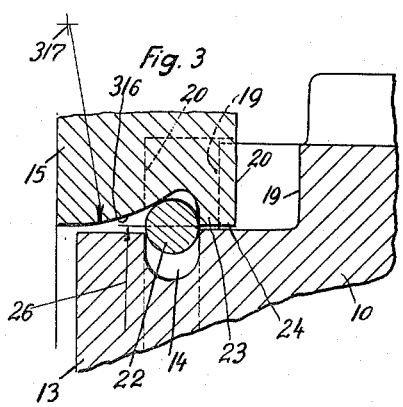
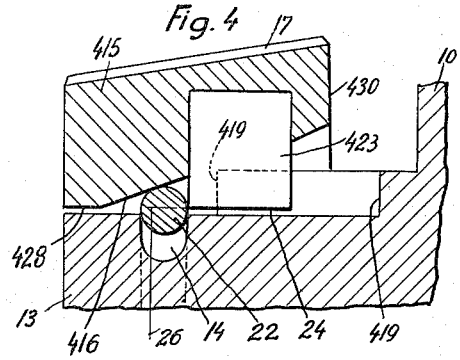

3,209,875
SYNCHRONIZED CLUTCH, PARTICULARLY FOR THE TRANSMISSION OF A MOTOR VEHICLE
Werner E. Altmann, Stuttgart, Germany, assignor to Daimler-Benz Aktiengesellschaft, Stuttgart-Unterturkheim, Germany
Filed Apr. 7, 1961, Ser. No. 101,506
Claims priority, application Germany, Apr. 7, 1960, D 33,048
8 Claims. (Cl. 192—66)

My invention relates to a synchronized clutch, particularly for the transmission of a motor vehicle, said clutch being of the type comprising a pair of clutch members mounted in coaxial relationship for relative axial engaging and disengaging movement and an annular synchronizing member mounted on one of said clutch members and provided with a friction face for engagement with a mating friction face on the other one of said clutch members. The clutch member carrying the annular synchronizing member and the latter are provided with circumferentially distributed interengaging repelling faces. These faces prevent axial displacement of the annular synchronizing member by engagement of the mating friction faces until the friction has substantially synchronized the clutch members.

In a clutch of this type resilient means must be provided for exerting an axial force on the annular synchronizing member pressing the mating friction faces upon each other in the course of the clutch-engaging movement and it is the primary object of my invention to provide the synchronized clutch with improved resilient means for that purpose.

More particularly, it is the object of my invention to provide the clutch with resilient means which require a minimum of space, do not increase the diameter of the clutch and require a minimum number of elements, thus resulting in a simple combination composed of a minimum of parts and capable of easy assembly and disassembly, easy repair and simple maintenance.

With the afore-said objects in view, my invention consists in the novel combinations and arrangements of parts hereinafter described in their preferred embodiments, pointed out in the subjoined claims and illustrated in the annexed drawing, wherein like parts are designated by the same reference characters throughout the several views.

It is to be understood, however, that my invention is in no way limited to such preferred embodiments but is capable of numerous modifications within the scope of the subjoined claims and that the terms and phrases used in the description have been chosen for the purpose of explanation rather than that of restriction or limitation of my invention.

In the drawings
FIG. 1 is a partial longitudinal section taken through a synchronized clutch constructed in accordance with my invention, the clutch members being in disengaged condition,
FIG. 2 shows a portion of FIG. 1 on an enlarged scale,
FIG. 3 is a sectional view, similar to that of FIG. 2, of a modified clutch and
FIG. 4 is a sectional view, similar to that of FIG. 3, of a third embodiment of my invention.

The synchronized clutch partly shown in FIG. 1 by way of an axial section includes a first clutch member 10 and a second clutch member 11, the member 10 comprising an annular gear 10 rotatably but non-shiftably mounted on a shaft (not shown). The two clutch members are mounted in coaxial relationship for relative axial engaging and disengaging movement. In the ebodiment shown this movement is performed by axial displacement of the clutch member 11 which is slidably mounted on the shaft carrying the gear 10 and is connected with the shaft for common rotation therewith, such displacement being effected by a bifurcated yoke member engaging an annular groove 12 of the clutch member 11 for displacing it along the shaft on which the annular gear 10 is journaled.

The shaft may be the driven shaft, for instance, of a speed change transmission of a motor vehicle.

The first clutch member 10 has a lateral portion 13 adjacent to the second clutch member 11. An annular synchronizing member 15 is mounted on the portion 13 for relative axial movement thereon. Mating conical friction faces 17 and 18 are provided on the annular synchronizing member 15 and on the second clutch member 11. Moreover, circumferentially distributed interengaging repelling faces are provided on the annular synchronizing member 15 and on the first clutch member 10 for preventing axial displacement of the annular member 15 towards the right with reference to FIG. 1, to wit towards the first clutch member 10, by the second clutch member 11 until the clutch members have been substantially synchronized. In the embodiment shown in FIG. 1 these repelling faces are formed on the clutch member 10 by an undulated shoulder 19 and on the member 15 by circumferentially distributed shallow recesses 21 provided in the right-hand end face of member 15, the bottoms 20 of such recesses merging into each other to form an undulated surface. As long as the clutch members 10 and 11 rotate at different velocities, while the friction faces 17 and 18 are in frictional engagement, the friction tends to turn the annular synchronizing member 15 relative to the clutch member 10 and to cause the inclined areas of surface 20 to ride up the inclined faces of the undulated end surface 19, whereby the displacement of the synchronizing member 15 towards the clutch member 10 will be opposed. Only after the clutch members 10 and 11 will have been synchronized by the friction of the conical faces 17 and 18 will the annular member 15 be able to move in axial direction towards the clutch member 10 until it reaches its limit position in which the crests of the bottom 20 will fully engage the valleys of the surface 19.

Alternatively, the faces 19 and 20 may be composed of relatively inclined plane surface elements.

Suitable resilient means are provided tending to move the annular synchronizing member 15 towards the left with reference to FIG. 1, to wit away from clutch member 10 and towards the clutch member 11.

As synchronized friction clutches of the type described hereinabove are well known in the art as shown, for instance, in my U.S. Patent No. 2,942,712 issued on June 28, 1960, a more detailed description thereof is deemed dispensable herewith.

While in prior clutches of this type the resilient means are formed either by a large centrally located helical spring or by a plurality of circumferentially distributed small helical springs, I have provided improved resilient means which will now be described.

The portion 13 of the clutch member 10 is provided with an outer peripheral groove 14, whereas the annular synchronizing member 15 has an inner peripheral surface 16 which surrounds the portion 13 and flares in a direction away from the second clutch member 11 or, in other words, towards the right with reference to FIG. 1. A snap spring 22 is inserted in the groove 14 and is biased to expand, thereby engaging the inner peripheral surface 16 of the annular member 15. As a result, the snap spring exerts an axial force component on the member 15 for pressing the mating friction faces 17 and 18 upon each other.

The snap spring 22 constitutes a stop for the annular member 15 limiting the axial displacement thereof in the direction towards the left with reference to FIG. 1 or, in other words, away from the first clutch member 10. For that purpose, stop means are provided on the annular synchronizing member 15 for engagement with the right-hand side of the snap ring remote from the second clutch member 11. These stop means project inwardly from the annular synchronizing member. In the embodiment shown in FIGS. 1 and 2 this stop means is formed by inner projections 23 provided on the inside of the annular member 15 adjacent to the crests of the undulated surface 20, each projection 23 having an inner face coinciding with a cylindrical surface 24 extending coaxially with respect to the member 15. The inner end wall of each projection 23 merges into the flaring surface 16 with a smoothly curved profile 25 which is so shaped as to permit the snap ring 22 to enter the grooves formed by the inner end walls of the projections 23 and by the flaring surface 16, as clearly shown in FIG. 2. Preferably, however, the diameter of the cylindrical surface 24 substantially equals the maximum central diameter 26 of the snap ring, as indicated in FIG. 3.

Moreover, the diameter of the cylindrical surface 24 is preferably larger than the minimum diameter 27 of the peripheral internal surface 16 which adjacent to clutch member 11 may merge into a cylindrical surface 28. In this event the portion 13 of clutch member 10 has a peripheral cylindrical surface having a diameter larger on the side at 29 than on the outside at 30 of the groove 14.

Preferably, the edge 31 of the groove 14 is chamfered.

The embodiment illustrated in FIG. 3 differs from that shown in FIG. 1 in that the inner peripheral surface 316 has a convex profile. The profile is formed by an arc of a circle having a center 317. Moreover, in this embodiment the peripheral surface of portion 13 has a diameter on the inside of groove 14 equaling the diameter on the outside of this groove. As a result of the convex profile of surface 316 a spring characteristic is obtained which upon axial displacement of member 15 towards clutch member 10 results in a decreasing increment of the axial component of the spring force. As a result, a smaller axial component will act on the member 15 in its innermost position. If desired, any desired spring characteristic may be obtained by a suitable profile of surface 16, or 316 respectively.

It is the purpose of the stop means 23 to prevent the annular synchronizing member 15 from being axially withdrawn from the portion 13 of the clutch member 10. As the annular snap spring 22 is in permanent resilient engagement with the inclined flaring surface 16, it will permanently exert the axial force component above referred to upon the synchronizing member 15. This component will maintain frictional engagement of the friction faces 17 and 18 during the axial displacement of clutch member 11. A cone angle of the flaring surface 16 of 20° has been found satisfactory. The depth of groove 14 is preferably so chosen that the snap spring 20 may fully retire thereinto. The undulated surfaces 19 and 20 are so correlated that, when they are fully engaged, the snap spring 22 still engages the flaring surface 16 and does not engage the cylindrical surface 28. Preferably, an ample clearance is provided between the peripheral surface 29 and the cylindrical surface 24 of the projections 23. Similarly, a clearance is provided between the surfaces 28 and 30.

In the embodiment of my invention illustrated in FIG. 4 the clutch members 10 and 11 are similar to those of the embodiment shown in FIGS. 1 and 2 and, therefore, need not be described. For the same reason, the clutch member 11 has not been illustrated in FIG. 4. The annular synchronizing member 415, however, differs from that shown in FIGS. 1 and 2 by the absence of the recesses 21 and of the projections 23. The flaring inner surface 416 of member 415 has a straight profile and extends between the inner end face 430 and the inner cylindrical face 428 of member 415. In this embodiment the stop means are formed by a plurality of circumferentially distributed radial pins 423 mounted in radial internal bores of the annular synchronizing member 415 to project inwardly from the inner peripheral surface 416 adjacent to the snap ring 22 on the side thereof remote from the second clutch member 11.

In FIG. 4 the annular synchronizing member 415 is shown in its outermost position in which the snap ring 22 has expanded and engages the stop pins 423. The inner end faces of the stop pins 423 are tangential to the cylindrical surface 24 referred to hereinabove which has a diameter equaling substantially the maximum central diameter 26 of the snap spring.

The pins 423 cooperate with the undulated surface 419 of the clutch member 10 in such a manner as to prevent displacement of the annular synchronizing member 415 towards the clutch member 10 until the clutch members are substantially synchronized. When such synchronization has taken place, the pins 423 may enter the valleys of the undulated surface 419, thus permitting the annular member 415 to move towards the right from the position shown in FIG. 4, whereby the snap ring 22 will be urged into the recess 14 while continuing to exert pressure on the flaring internal surface 416.

Where the stop means is formed by a plurality of circumferentially distributed projections 23 separated from each other by the recesses 21 and where the flaring surface 16 is intersected by the undulated surface 20 as in the embodiments shown in FIGS. 1, 2 and 3, it may happen during the rotary displacement of the annular member 15 relative to the clutch member 10 that the ends of the split snap ring 22 get caught by the edges of the projections 23. This undesirable consequence of the discontinuity of the surfaces 16 and 25 in circumferential direction is avoided in FIG. 4, since the repelling faces formed by the undulated surface 419 are axially spaced from any plane which is normal to the axis of the clutch members and extends through the groove 14 and since, consequently, the zone of surface 416 engaged by the snap ring 22 is continuous in circumferential direction and since the stop pins 423 engage the snap ring 22 with their smooth cylindrical faces.

The advantages of the invention as here outlined are best realized when all of its features and instrumentalities are combined in one and the same structure, but useful devices may be produced embodying less than the whole.

It will be obvious to those skilled in the art to which the invention apertains, that the same may be incorporated in several different constructions. The accompanying drawin, therefore, is submitted merely as showing the preferred exemplification of the invention.

From the foregoing it wil be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a synchronized clutch, the combination comprising a first clutch member and a second clutch member both mounted in coaxial relationship for relative axial engaging and disengaging movement, an annular synchronizing member mounted on said first clutch member for limited relative rotation and axial displacement thereon, mating friction faces being provided on said annular synchronizing member and on said second clutch member, circumferentially distributed interengaging repelling faces being provided on said anular synchronizing member and on said first clutch member for opposing axial displacement of said annular member towards said first clutch member by said second clutch member, said first clutch member having a portion provided with an outer peripheral groove a spring mounted in said peripheral groove and engaging said annular synchronizing member for exerting an axial force thereon directed away from said first clutch member, said annular synchronizing member comprising a ring member projecting radially inwardly of said annular synchronizing member and having abutment surface means, said repelling face on said synchronizing member comprising an annular face portion of said inwardly projecting ring member, stop means for said anular synchronizing member comprising said spring and said abutment surface means, said stop means limiting said limited axial displacement in the direction away from said first clutch member, said annular synchronizing member being provided with an inner peripheral surface surrounding said portion and flaring toward said first member, said spring being formed by a snap ring engaging both said groove and said inner peripheral surface and being so biased as to tend to expand, means including said inner peripheral surface and said abutment surface means pressing said ring into constant engagement with portions of said peripheral groove.

2. The combination claimed in claim 1 in which said inner peripheral surface and said abutment surface means cooperate to form a peripheral groove having a substantially triangular cross sectional profile.

3. The combination claimed in claim 1 in which said annular synchronizing member has a side face which faces said first clutch member and intersects said inner peripheral surface, said means projecting radially inwardly of said annular synchronizing member being formed by a plurality of pins of arcuate cross section mounted on the inside of said annular synchronizing member in circumferentially distributed relationship thereto, said pins having curved surfaces which comprise said abutment surface means and one of said repelling faces.

4. In a synchronized clutch, the combination comprising a first clutch member and a second clutch member both mounted in coaxial relationship for relative axial engaging and disengaging movement, said first clutch member being provided with a portion located adjacent to said second clutch member and provided with an outer peripheral groove, an annular synchronizing member coaxial with said clutch members and provided with an inner peripheral surface which surrounds said portion and flares in a direction away from said second clutch member, mating friction faces being provided on said annular synchronizing member and on said second clutch member, a snap ring inserted in said groove and engaging said inner peripheral surface and being biased to expand to thereby exert an axial force component on said annular synchronizing member for pressing said mating friction faces upon each other, means including said inner peripheral surface for retaining said ring in constant engagement with portions of said groove circumferentially distributed interengaging repelling faces being provided on said annular synchronizing member and on said first clutch member for opposing axial displacement of said anular member towards said first clutch member by said second clutch member, and depending means on said anular synchronizing member comprising stop means for engagement with the side of said snap ring remote from said second clutch member, said repelling face on said annular synchronizing member being disposed on said depending means, said depending means projecting inwardly from said annular synchronizing member and terminating in a cylindrical surface facing radially inwardly of said annular synchronizing member and having a diameter substantially equaling the maximum central diameter of said snap ring.

5. The combination claimed in claim 4 in which said inner peripheral surface of said annular synchronizing member has a convex profile.

6. The combination claimed in claim 4 in which said cylindrical surface has a diameter larger than the minimum diameter of said inner peripheral surface, said portion of said first member having a peripheral surface of revolution having a diameter larger on the inside than on the outside of said groove.

7. The combination claimed in claim 6 in which at least one edge of said groove is chamfered.

8. The combination claimed in claim 4 in which said repelling faces are axially spaced from any plane which is normal to the axis of said clutch members and extends through said groove.

References Cited by the Examiner
UNITED STATES PATENTS

| | | | |
|---|---|---|---|
| 1,043,406 | 11/12 | Denio | 192—52 |
| 1,987,194 | 6/35 | Kingston | 192—52 X |
| 2,162,250 | 6/39 | Emrick | 192—66 |
| 2,518,734 | 8/50 | Wemp. | |
| 2,942,712 | 6/60 | Altmann | 192—114 |
| 3,001,413 | 9/61 | Burckhardt | 192—32 X |
| 3,035,674 | 5/62 | Peras. | |

DAVID J. WILLIAMOWSKY, *Primary Examiner.*

THOMAS J. HICKEY, *Examiner.*